United States Patent [19]
Smitt

[11] Patent Number: 5,926,570
[45] Date of Patent: Jul. 20, 1999

[54] OPTICAL SCANNER USING DITHERING WITH ADAPTIVE THRESHOLD

[75] Inventor: Asbjørn Smitt, Ålsgårde, Denmark

[73] Assignee: Contex A/S, Denmark

[21] Appl. No.: 08/844,684

[22] Filed: Apr. 18, 1997

[51] Int. Cl.[6] .............................. G06K 9/36; G06K 9/46
[52] U.S. Cl. ..................... 382/237; 382/270; 358/455; 358/464; 358/466
[58] Field of Search ................... 382/237, 270; 358/455, 456, 457, 458, 459, 468, 474, 464, 465, 466

[56] References Cited

U.S. PATENT DOCUMENTS

| | | | |
|---|---|---|---|
| 4,975,786 | 12/1990 | Katayama et al. | 358/459 |
| 5,452,107 | 9/1995 | Koike | 358/468 |
| 5,502,578 | 3/1996 | Smitt | 358/474 |

Primary Examiner—Thomas D. Lee
Attorney, Agent, or Firm—Brinks Hofer Gilson & Lione

[57] ABSTRACT

A method and apparatus of preparing the reproduction of a document based on scanning the original including generating a signal representing grey tone values for points along lines across the scanned original and providing a set of threshold values for said points. The set of threshold values being determined so that grey tone values in a uniform area on the original are converted into a uniform black or white representation in a first one-bit representation. The method and apparatus provides parameter values for said points in a dither circuit, and converts the grey tone signal received from the line scanning unit into a signal comprising a second one-bit representation. The conversion into a one-bit representation is performed by depending on the individual grey tone values compared with the present threshold values and the dither circuit output for the points in question.

36 Claims, 8 Drawing Sheets

OPTICAL SCANNER USING DITHERING WITH ADAPTIVE THRESHOLD

BACKGROUND OF THE INVENTION

1. Field of the Invention

The invention relates in general to a method and apparatus for preparing the reproduction of a document based on scanning the original, and in particular, to such a method and apparatus utilizing the output of a dither circuit to represent grey toned values.

2. Description of the Prior Art

In general, when optical scanners scan, they generate an electronic signal representing grey tone values for points along lines across the scanned document. The grey tone values are typically represented as a digital multi-bit signal. Thereby the threshold value may be adapted to the foreground/background variations in shades of grey across the document to remove "noise" from the scanned data. Thresholding is used to convert the multi-bit, e.g. an 8-bit representation of a pixel, to a 1-bit representation.

Using this conversion white and pale grey areas become white, and black and dark grey areas become black. The shades represented by the grey tones in between black and white will be lost. This is a disadvantage if the document has to be reproduced on an output device for viewing, as information communicated in the grey tones of the document is lost. An advantage is that because the "noise" is removed by the adaptive threshold process, the 1-bit representation may be compacted, thereby reducing the amount of data to be transferred for reproduction or to be stored on a storage device.

Alternatively, a 1-bit representation can be achieved by halftoning, whereby grey areas keep their overall grey appearance due to a dither distribution of black and white pixels in the grey areas corresponding to the original grey tones on the scanned document. A disadvantage is that because "noise" is added by the halftoning process, the 1-bit representation cannot be very compacted, thereby increasing the amount of data to be transferred for reproduction or to be stored on a storage device. Another disadvantage is that dark grey areas representative of foreground features are dithered to a grey appearance instead of black, thereby reducing the contrast of the reproduction.

Halftoning is described in "A Fast Algorithm for General Raster Rotation", from Graphics Interface '86, by a Paeth (1986); "On the Error diffusion Technique for Electronic Halftoning" by Billotet-Hoffmann and Bryngdahl, Proc. SID vol. 24/3,1983, pp 252–258; and "An Adaptive Algorithm for Spatial Greyscale", by Floyd and Steinberg, Proc. SID vol. 17/2, 1976, pp 75–77.

Accordingly, a need in the art arises for an optical scanner that is capable of reproducing the scanned document without losing grey toned information, and without requiring very large amounts of data to be transferred and stored.

SUMMARY OF THE INVENTION

The present invention provides a method and apparatus for preparing the reproduction of a document based on scanning of the original comprising generating a signal representing grey tone values for points along lines across the scanned original, providing a set of adaptive threshold values for said points, providing a one-bit representation for said points in the form of output from a dither circuit representative of the grey tone of the points in said area received from the line scanning. Said one-bit representation is converted into a new one-bit-representation. The output of said conversion is responsive to the individual grey tone values and the present threshold values.

The invention provides a method in which the multi-bit representation of the scanned document is converted into a one-bit representation. According to the invention grey areas keep their overall grey appearance due to a dither distribution of black and white pixels in the grey areas corresponding to the original grey tone on the scanned document for grey foreground parts of the document, but the grey areas are forced to black in the dark grey foreground parts of the document having grey tones below the adaptive threshold. Preferably the conversion comprises: comparing the grey tone signal with adaptive threshold values to obtain a first one-bit representation, passing the grey tone signal through a dither circuit to obtain a second one-bit representation, and selecting one of the two one-bit representations.

According to the invention, the adaptive threshold is decisive for whether a pixel will be dithered or not. This decision depends on the continuously adaptively decided foreground limit of the present parts of the scanned document. Therefore it is possible to maintain the high contrast black and white appearance of the foreground areas of the scanned document and at the same time maintain the grey tone appearance of pale grey intermediate areas between the foreground and background, such as pencil lines, stamps and so on from the scanned document to the reproduced copy. The dithering may be performed on the individual pixels or on pixel groups, as appropriate.

In a preferred embodiment of the invention means are provided for excluding very light parts of the document from the adaptive foreground determination forcing the dither representation to black. This is done because these parts of the document often contain both background and foreground information only discernible by their grey tone (dithered) representation that would otherwise be suppressed by the adaptive thresholding. This procedure ensures both enhanced contrast of the dark grey foreground parts and an overall grey appearance to the grey areas in the prepared reproduction of the document. This one-bit representation is compactable, decreasing the amount of data to be transferred for reproduction or storing on a storage device.

Furthermore the invention relates to an apparatus for preparing the reproduction of a document based on scanning of the original, said apparatus includes a line scanning unit for generating a signal representing grey tone values for points along lines across the scanned original, means for providing adaptive threshold values for said points, said threshold values being determined so that grey tone values in an area on the original are converted into a black or white representation in a one-bit representation, means for providing a one-bit representation for said points in the form of output from a dither circuit, and a converter for converting the grey tone signal received from the line scanning unit into a signal comprising a one-bit representation. The conversion is performed under control of the pixel clock signal and a variable resolution clock derived from the pixel clock, and the conversion depends on the individual grey tone values compared with the present threshold values and dithering of the values for the points in question.

BRIEF DESCRIPTION OF THE DRAWINGS

The present invention is illustrated by way of example and not limitation and will be explained more fully below in connection with preferred embodiments and with reference to the drawings, in which like references indicate similar elements and in which:

FIG. 4(a) shows a standard dither matrix;

FIG. 4(b) shows a corrected dither matrix;

DETAILED DESCRIPTION OF THE PREFERRED EMBODIMENT

Figure 1:
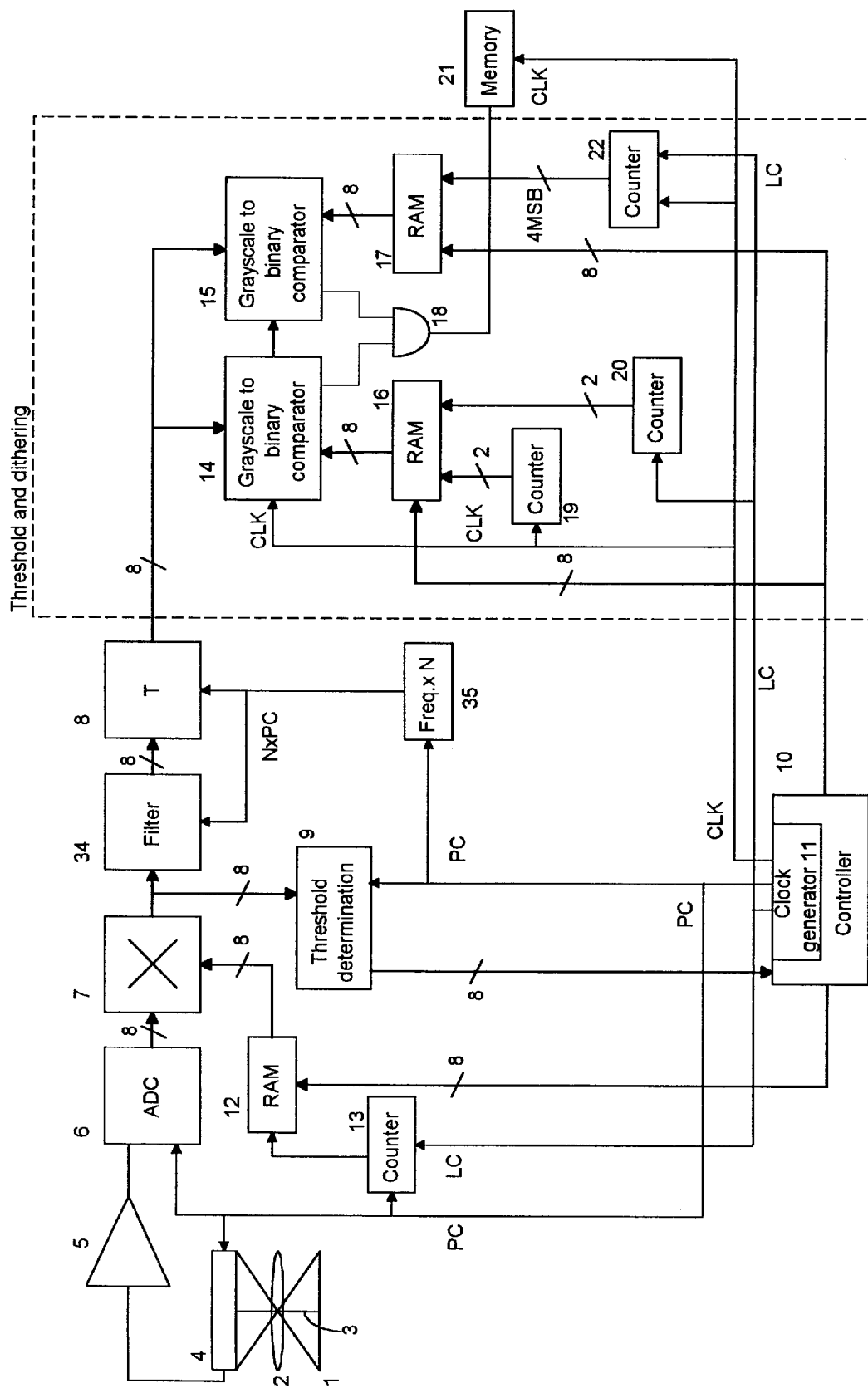
FIG. 1 shows an apparatus for scanning a document and preparing the signal provided by the scanning for reproduction according to the invention.

The preferred embodiment of the scanner according to the invention is shown in FIG. I and is based on successive scanning of lines on a document 1. The scanner may be the flat bed, roller, drum, or another type. A lens system, e.g. a lens 2, having an optical axis 3, images a line from the document 1 on a line sensing array 4, which can be a CCD unit. When the amount of light detected by the cells in the array 4 has been read out from the array 4, the document is moved slightly for scanning the next line.

The analog voltage from the cells of the array 4 is clocked out by using a pixel clock signal PC provided by a clock generator unit 11 associated with the controller 10 of the scanner. The sequence of analog voltage levels is transferred from the array 4 to an amplifier 5 for amplification. The amplified analog signal is converted into a multi-bit signal or an 8-bit signal in an analog to digital converter (ADC) 6. The conversion is controlled by the pixel clock PC.

A reference has been scanned in advance, whereby the controller unit 10 has been able to calculate the sensitivity for each of the cells in the array 4. This knowledge is used to determine a correction factor for each of the cells in the array. These correction factors are transferred from the controller 10 to a RAM memory 12. A counter 13 is reset by a line clock signal LC from the clock generator unit 11 and is increased by one each time it receives a pixel clock pulse. The counter value represents the pixel number in a line and is transferred to the RAM memory 12 for addressing the corresponding correction factor. The correction factor is transferred to a multiplier 7 in which the digitized pixel value is compensated with the corresponding correction factor.

A threshold for the binary decision of a given pixel ("0" for black, "1" for white) should be set in such a way that if it belongs to the foreground of the scanned document, e.g. is significantly darker than other pixels in its neighborhood, it is called black. A technique useful for that purpose is called adaptive or dynamic thresholding and this technique is e.g. described in "Image Thresholding for Optical Character Recognition and Other Applications requiring Character Image Extraction" from IBM J. RES. DEVELOP. vol 27, no.4, 1983, by J. M. White and G. D. Rohrer. It should be noted that the terms "adaptive thresholding" and "adaptive thresholding circuit" are to be interpreted very broadly in the present application, covering the use of adaptive threshold techniques based on e.g. the moving average, area average, local average or statistical distribution of the grey tones represented in the scanned data. The threshold determination is performed on-line, i.e. the threshold values are updated simultaneously with data being scanned. A preferred way of doing so is described in the U.S. Pat. No. 5,377,020 assigned to the assignee of this case and hereby incorporated by reference.

The corrected 8-bit signal from the multiplier 7 is split in a branch, and one part is received by an adaptive threshold determining circuit 9. The threshold determining circuit 9 determines adaptive thresholds for pixels along the scanned lines, and the determined adaptive threshold values are transferred to the controller 10.

The other part of the branched 8-bit signal is received by a digital interpolation filter unit 34 which, for each received 8-bit grey tone value, outputs either one 8-bit grey tone value or an increased number N of interpolated 8-bit grey tone values depending on the N×PC clock output from a clock multiplier unit 35. A preferred way of doing this is derived in the U.S. Pat. No. 5,502,578 assigned to the assignee of this case and hereby incorporated by reference. In case of N having the value one, digital interpolation filter unit 34 is transparent and passes on the received 8-bit signal.

The 8-bit grey tone values from the digital filter unit 34 are received by a delay unit 8, e.g. a FIFO register. The duration of the delay depends on the lag of the calculated threshold values and is discussed in the U.S. Pat. No. 5,377,020. The N×PC clock shifts the digital data through the FIFO register 8.

The digital 8-bit grey tone values are transferred from the delay to two grey-scale-to-binary-comparators 14, 15. In the comparator 14 the 8-bit grey tone values are compared with threshold values stored in the RAM 16, and in comparator 15 the 8-bit grey tone values are compared with threshold values stored in the RAM 17. The comparators 14 and 15 are controlled by the resolution clock CLK from the clock generator unit 11. The CLK clock pulses are a selected subset of the N×PC clock pulses, and the selection is made by the clock generator unit 11 and controller 10 so as to obtain a preselected output resolution from the two grey-scale-to-binary-comparators 14, 15. This is discussed in detail in the U.S. Pat. No. 5,502,578.

The controller 10 transfers the threshold values determined by the threshold determining circuit 9 to a RAM 17. A counter 22 is reset by a line clock signal LC from the clock generator unit 11 and is increased by one each time it receives a CLK clock pulse. The counter value represents the pixel number in a line and the four most significant bits (4 MSB corresponds to sixteen zones) are transferred to the RAM 17 for addressing the corresponding threshold value. The addressed threshold value is transferred to the grey-scale-to-binary-comparator 15. In the grey-scale-to-binary-comparator to the grey tone value is compared with the addressed threshold, and if the grey tone value exceeds the threshold value, the output of the comparator will be the binary value "1" (white), otherwise "0" (black).

It is desired to reproduce the scanned document in a manner where "dark grey areas" become black ("0") and "white areas" become white ("1"), while grey areas in between keep their overall grey appearance due to a pseudo random distribution of black and white pixels in the grey area corresponding to the original tones of grey on the scanned document. It is well known to obtain a grey area appearance in a 1-bit per pixel reproduction.

A technique useful for that purpose is called dithering, and this is described in "Digital Halftoning", by Robert Ulichney, the MIT Press, published 1987. It should be noted that the terms "dithering" and "dither circuits" are to be interpreted very broadly in the present application, covering both the use of traditional dither matrices and error diffusion techniques. The purpose of dithering is to convert a grey area on the scanned document into an area with a similar grey appearance obtained by an appropriate distribution of black and white spots on the reproduction. In general this is achieved by providing black spots on a white sheet.

It is well-known to a man skilled in the art to define the size of a dither matrix and the dither values or threshold values in the matrix. For the present purpose the dither matrices may be established in several ways. In one embodiment, the matrix may be determined universally for the scanner and never changed. According to the preferred embodiment the matrix is alterable by the controller during scanning and is varied in dependence on the statistical distribution of the adaptive threshold values known from the threshold determination.

Figures 3, 4:
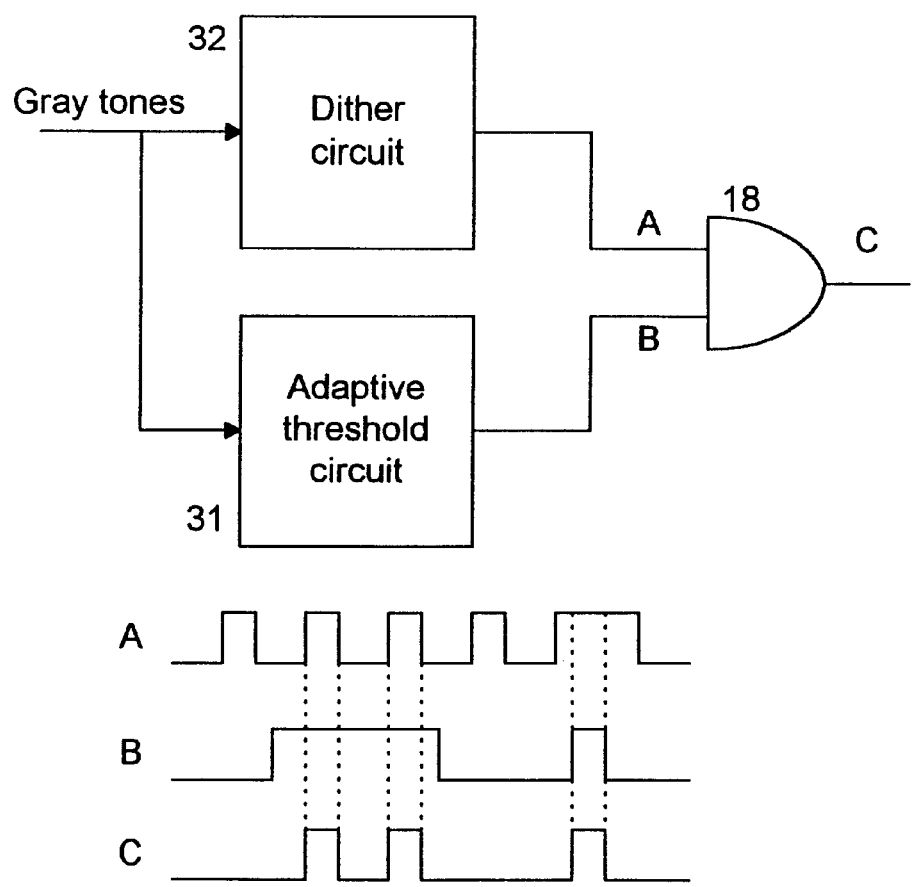
FIG. 3 schematically shows how the dither matrix may be corrected for the dark or light background.

In the embodiment shown in FIG. 1, the dither matrix comprises a 4×4 element, as shown in FIG. 4. The controller 10 transfers a single dither matrix to a RAM 16, and two 2-bit counters 19, 20 count the number of pulses in the resolution clock signal CLK and the line clock signal LC, respectively. The two 2-bit counters 19, 20 wrap around when overflow occurs. The counter value addresses (line, row) the element in the dither matrix corresponding to the pixel present on the input of the grey-scale-to-binary-comparator 14. In the grey-scale-to-binary-comparator 14 the grey tone value is compared with the addressed dither matrix element, and if the grey tone value exceeds the matrix element value the output of the comparator will be the binary value "1" (white), otherwise "0" (black).

The outputs from the two-grey-scale-to-binary-comparators 14, 15 are received by a logical AND gate 18, and if both the outputs from the two grey-scale-to-binary-comparators 14, 15 are the binary value "1", the AND gate 18 will output the binary value "1" (white) as the 1-bit representation of the pixel, otherwise "0" (black). This value may be printed on e.g. a laser printer, viewed on a display device, or stored in a file.

Figure 2:
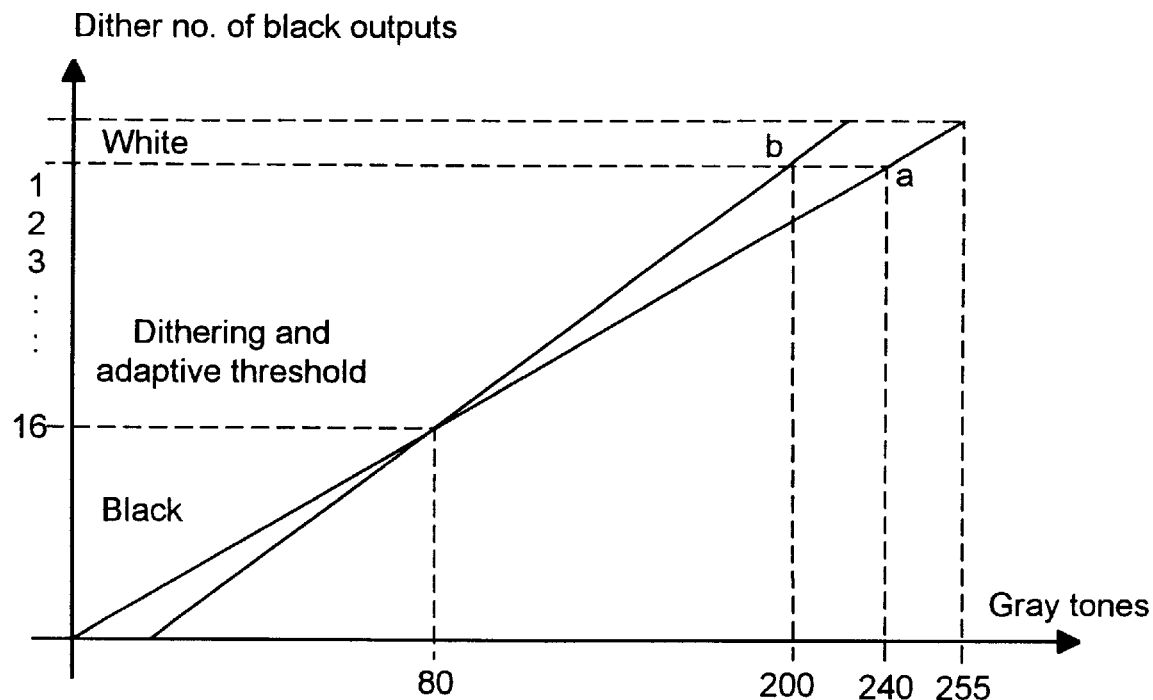
FIG. 2 illustrates the function of the apparatus shown in FIG. 1.

FIG. 2 illustrates the function of the apparatus shown in FIG. 1. The digital 8-bit grey tone values from the delay 8 are mapped into a binary grey tone representation by means of a dither matrix. The dither matrix shown in FIG. 4a is stored in the dither RAM 16. When a grey tone value above the highest value (here 240) in the dither matrix is received on the input of the two grey-scale-to-binary-comparators 14, 15, the output from the dither comparator 14 will always be "1". This means that the output from the AND gate 18 will become a "1" if the grey tone value is above the threshold value in the threshold comparator 15. When a grey tone value is below the lowest value (here 80) in the dither matrix, the output from the dither comparator 14 will always be "0", and the output from the AND gate 18 will always be "0". When the grey tone value is in the range between 80 and 240, the output from the AND gate 18 will be "1" if the current grey tone value exceeds both the adaptive threshold value and the dither value, and "0" if the current grey tone value is lower than or equal to either the adaptive threshold value or the dither value.

When the scanned original is very dark, light areas may become white by increasing the slope of the line a in the coordinate system shown in FIG. 2. By using the curve b, all grey tone values above 200 will be imaged into white pixels. This may be done by a relative reduction of the dither values in the dither matrix in FIG. 4a. The dither matrix shown in FIG. 4b corresponds to curve b in FIG. 2. In the dither matrix the maximum value sets an upper limit above which all grey tone values are turned into white. The minimum value in the dither matrix sets a lower limit below which all grey tone values are turned into black.

The information about the foreground/background shades of the original is already present in the apparatus as adaptive threshold values from the adaptive threshold determination unit 31 (FIG. 3). Therefore this information may be transferred to the unit 32; that is via the controller 10, in FIG. 1 determining the algorithm for the dither matrix.

According to the invention, grey areas keep their overall grey appearance due to a dither distribution of black and white pixels in the grey areas corresponding to the original grey tone on the scanned document for grey foreground parts of the document, but is forced to black in the dark grey foreground parts of the document having grey tones below the adaptive threshold. According to a preferred embodiment of the invention, means are provided for preventing very light parts of the document from being forced to black when the adaptive threshold detects the foreground in these parts, maintaining the dither representation, as these very light parts often contain information that would otherwise be suppressed by the adaptive thresholding.

Figure 11:
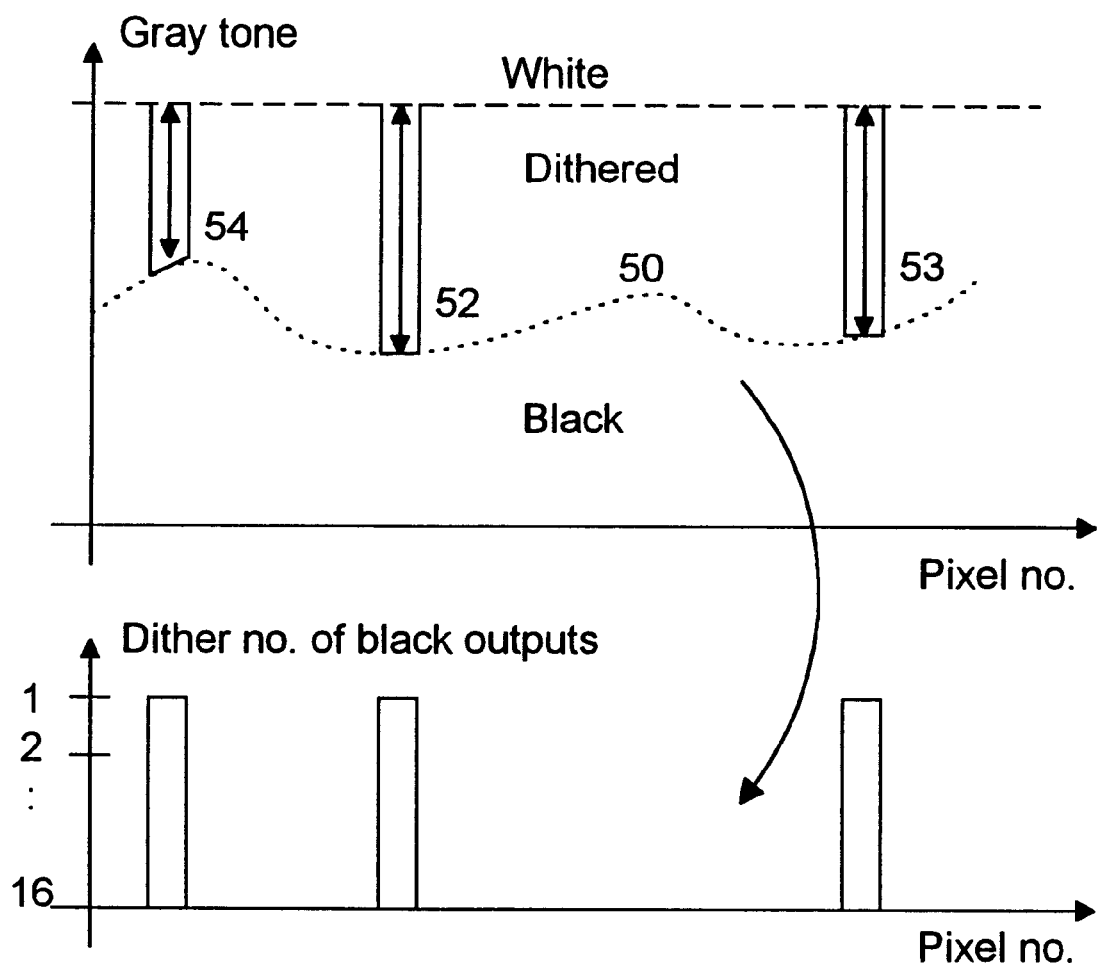
FIG. 11 shows how lines on a document with a 'weaving' foreground can be reproduced.

A preferred method of determining values in the dither matrix as a function of the adaptive threshold is to set the minimum value in the dither matrix equal to a collection of information on the actual adaptive threshold values, e.g. a running average. In order to maintain an optimal grey tone resolution, that is a resolution of 16 for a four times four dither matrix, the values in the dither matrix may be distributed between the minimum and maximum values so as to provide the optimal visual distinction. With this approach, the effect of a weaving grey tone foreground is eliminated due to the fact that the adaptive threshold is a representation of the foreground, and that the dither matrix is adapted to this foreground representation. In a practical implementation it will be sufficient to select one out of a number of predefined dither matrices depending on the actual threshold value. FIG. 11 shows a scan line from a scanned document. Event though the foreground 50 is 'weaving', the three lines 52, 53, 54 printed on the document will be reproduced with almost the same binary grey tone representation (dither value).

The function illustrated in FIG. 11 is implemented by the controller 10 which receives the actual threshold values from threshold determination unit 9, and which performs the collection of statistical information and uses the gathered threshold statistics as an input to a transfer function determining the actual dithering matrix to be used. The controller 10 finally loads the matrix to the RAM 16. The dithering representation is hereby transformed so that the 'weaving' foreground is removed from the grey tone representation output from the dither circuit.

Figure 5:
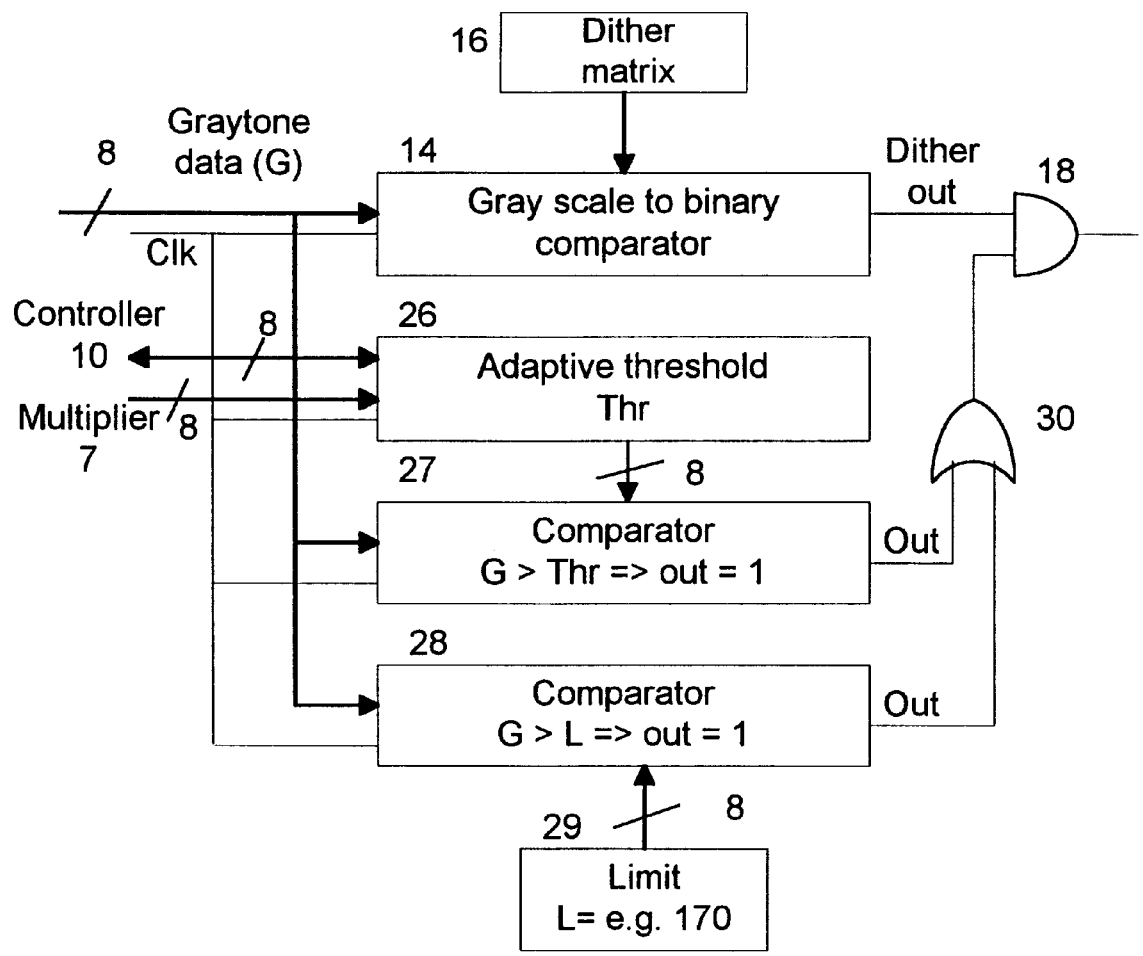
FIG. 5 shows an alternative embodiment of the configuration of the dither circuit and the threshold circuit.

An alternative embodiment of the configuration of the dither circuit and the threshold circuit is shown in FIG. 5. The signal comprising the scanned grey tone values is transferred from the delay 8 via a multi-bit bus (8 bit) to the grey-scale-to-binary-comparator 14 in which the grey tone values are compared with the dither values in the dither matrix. The values in the dither matrix are received from a RAM 16 including the values as discussed above.

The underlayed grey values from the multiplier 7 are transferred to a circuit 26 for determination of the adaptive threshold values in dependence on said transferred underlayed grey tone values from the original. This can be done as described above.

Two grey-scale-to-binary-comparators 27 and 28 receive the grey tone values (G) from the multi-bit bus. The first comparator compares the present grey tone value "G" with the adaptive threshold value (like the comparator 15 in FIG. 1), and gives the value '1' as the output if the grey tone "G" exceeds the threshold. The second comparator compares the present grey tone value "G" with a fixed limit value "L", and gives the value "1" as the output if the grey tone "G" exceeds this limit "L". The outputs from the two comparators 27 and 28 are fed to a logical OR gate 30 which gives the value "1" as the output if at least one of the outputs from the comparators has the value "1".

Compared with the embodiment shown in FIG. 1, the threshold part 26–30 gives the output "1" when "G" exceeds the fixed limit value "L", e.g. 170. This means that the adaptive threshold is inactive above the limit "L", whereby an "almost" white area (typically in the grey tone range 170–240) will be dithered. Lines from e.g. soft crayons will hereby be visible.

Figure 6:
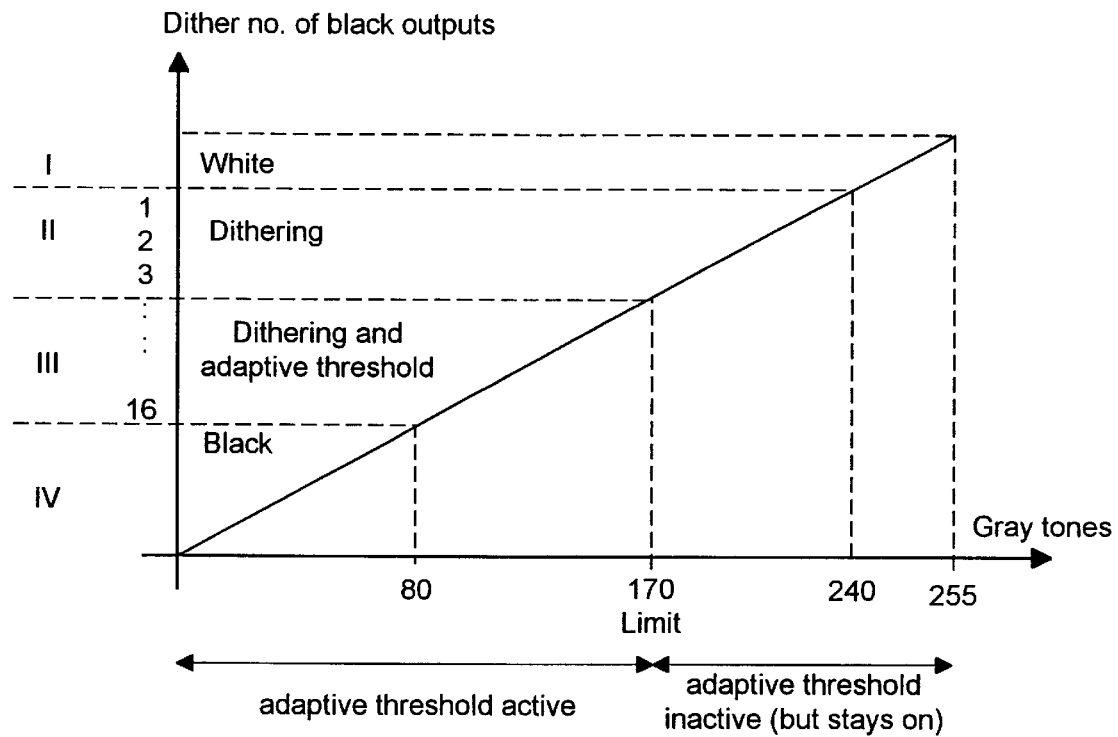
FIG. 6 illustrates the multi-bit to 1-bit conversion in the unit shown in FIG. 5.
Figure 7:
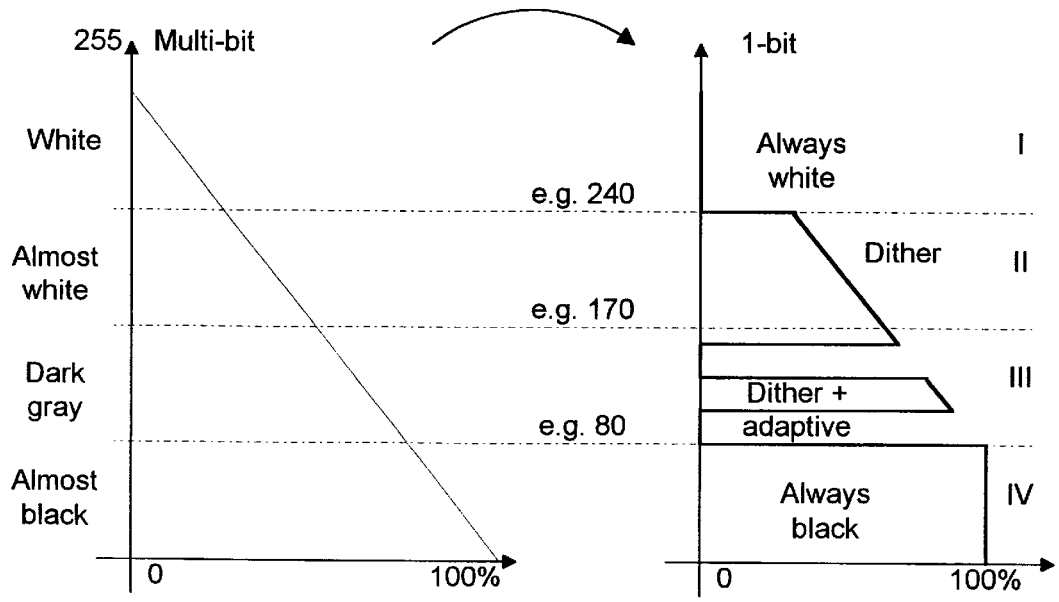
FIG. 7 illustrates the multi-bit to 1-bit conversion in the unit shown in FIG. 5.

FIG. 6 and 7 show two different ways of illustrating the multi-bit to 1-bit conversion in the unit disclosed with reference FIG. 5. In FIG. 6 the grey tone values are depicted on the x axis in the range 0–255 (for an 8-bit signal). The y axis shows how the grey tone values are classified into four categories (I–IV) and indicates the transformation technique. The same is shown in FIG. 7 where the left triangle illustrates the multi-bit signal and the right triangle the 1-bit signal for reproduction.

With a dither matrix as shown in FIG. 4a, the transformation of the grey tone values generated by scanning into the 1 bit representation, as explained with reference to FIG. 5 will be discussed with reference to FIG. 6 and FIG. 7. As will be seen from FIG. 4a, all dither values (1–16) are located within a range (here 80 to 240).

The output from a "white area" with grey tone values in the range 240–255 will exceed the limit L, whereby the output from the comparator 28 and thereby the OR gate 30 will be "1"; also the output of the dither circuit 14 is always "1", causing the output of AND gate 18 to always be "1". The transformation of these "white pixels" will be placed in the range I in FIGS. 6 and 7.

The output from an "almost white area" with grey tone values in the range 170–240 will always be dithered in this embodiment. The grey tone values will exceed the limit L, whereby the output from the comparator 28 and thereby the OR gate 30 will be "1". This will allow the signal from the dither circuit 14 to just pass through the AND gate 18. The transformation of these "almost white pixels" will be placed in the range II in FIGS. 6 and 7.

In this embodiment the output from a "grey area" with grey tone values in the range 80–170 will be either dithered when the grey tone values exceed the adaptive threshold "Thr", or black when the grey tone values are lower than or equal to the adaptive threshold "Thr". When the grey tone values exceed the adaptive threshold, the output from the comparator 27 and thereby the OR gate 30 will be "1". This will allow the signal from the dither circuit 14 to just pass the AND gate 18. When the grey tone values are lower than or equal to the adaptive threshold, the output from the comparator 27 and thereby the OR gate 30 will be "0". Thereby the output from the AND gate will become a "0". The transformation of these "grey pixels" will be placed in the range III in FIGS. 6 and 7.

The output from an "almost black area" with grey tone values in the range 0–79 will always be black in this embodiment. The grey tone values will never exceed the lowest dither values, whereby the output from the AND gate 18 will always be "0". The transformation of these "almost black pixels" will be placed in the range IV in FIGS. 6 and 7.

Figure 8:
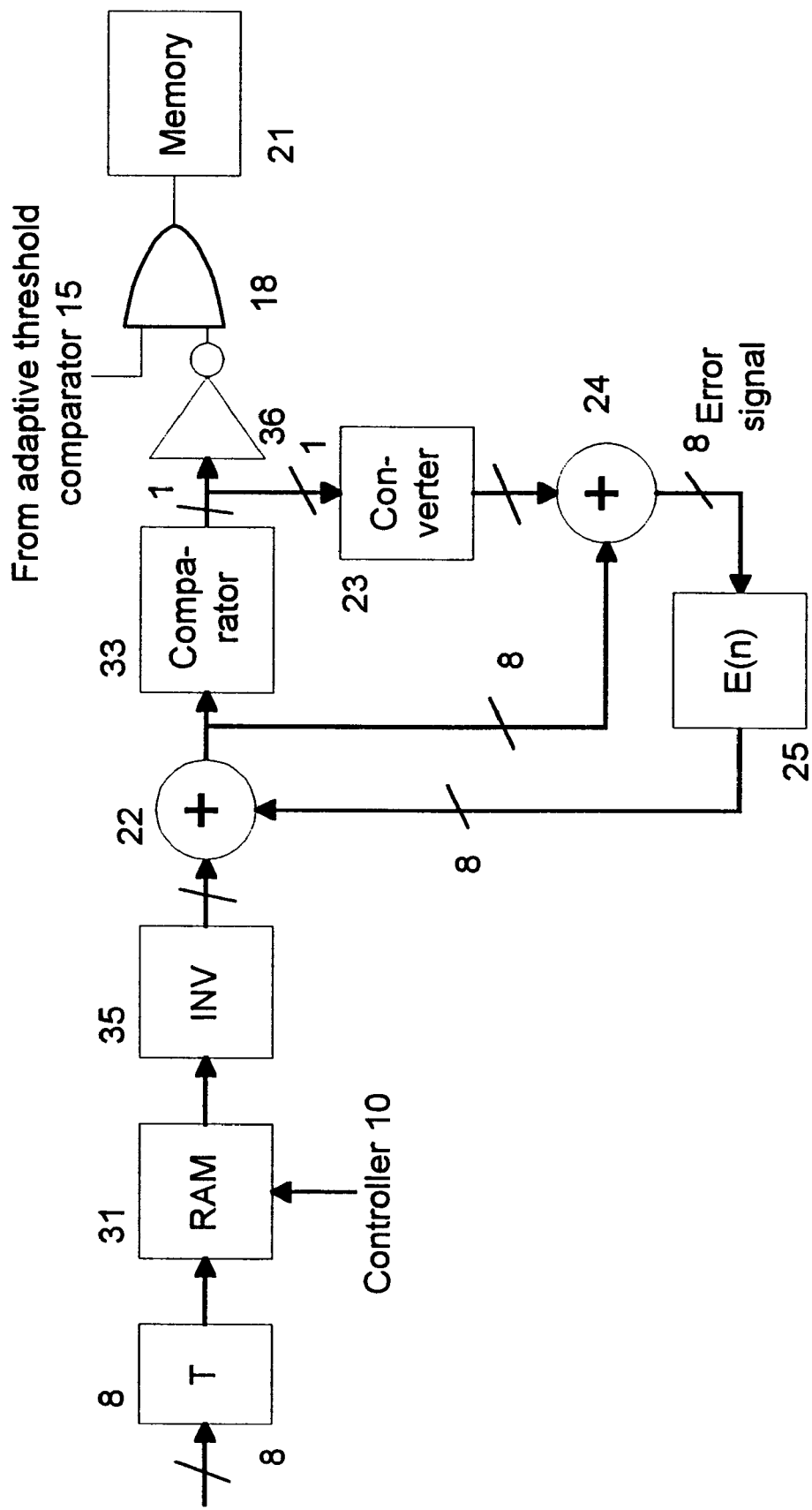
FIG. 8 shows an embodiment based on an error diffusion algorithm according to the invention.

A further alternative embodiment of a dither circuit for a unit according to the invention is shown in FIG. 8. The dither circuit is based on an error diffusion algorithm. The dither circuit in FIG. 8 may replace the corresponding parts shown in FIG. 1 and FIG. 5, said parts comprising the dither circuit 14, 16, 19, 20 based on a dither matrix.

In the present embodiment the multi-bit signal comprises values 8-bit (values 0–255) and is passed from the delay 8 via a look-up RAM 31 to the multi-bit inverter 35 inverting 8-bit values in the range 0–255 to 8-bit values in the range 255–0. The output of multi-bit inverter 35 is passed to an adder 22. An error signal is added to the delayed signal in the adder 22. The compensated signal from the adder 22 is fed to a comparator 33 for conversion into a one-bit representation in dependence on the comparison of its grey tone value and a fixed threshold greater than or equal to the value of 255. The output from the comparator 33 is fed via the single bit inverter 36 to the memory 21 for storing before the reproduction or saving to disk storage.

The one-bit output signal from the comparator 33 is branched into a converter 23, in which the values "0" and "1" are converted into the values "0" and "255". This 8-bit signal with two valid values represents the pixels in the generated one-bit representation and is used for the compensation of the subsequent pixels. The compensated signal from the adder 22 is fed via a branch to a second adder 24. In this adder the signal from the converter 23 is subtracted from the compensated signal from the adder 22 for generating a representation for the error generated by the conversion in the comparator 33. This error representation is fed into an error filter unit 25 in which the errors are fractionated and stored for correcting subsequent pixels. The fractionated errors for the pixels are summed up before correction of the subsequent pixels. Errors in the conversion are hereby used to generate correction factors in a way so that the overall appearance of the original and the reproduction will be the same.

Figure 9:
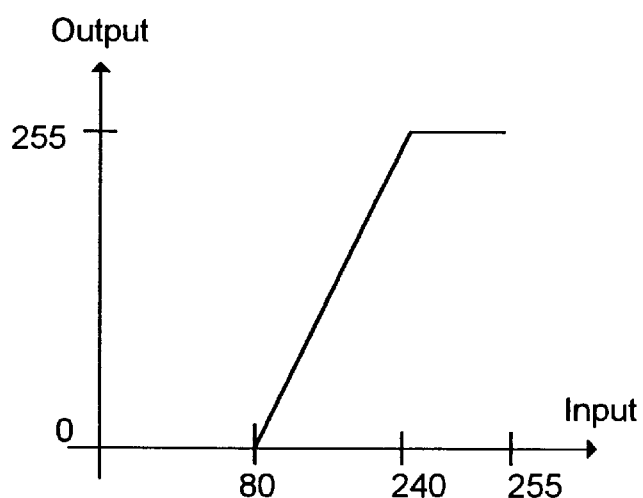
FIG. 9 shows an example of a transfer curve stored in a look-up RAM according to a preferred embodiment of the invention.

An example of a transfer curve stored in the loop-up RAM 31 by the controller 10 is shown in FIG. 9. Similar to the function of the dither RAM 16 described above, the grey scale values exceeding a predetermined "highest value" (e.g. 240) are forced to be "white" (and will have the value 255). This will, via inverter 35, force the input to adder 22 to the 8-bit value 0, and as the 8-bit error signal from the error filter 25 comprising the other input to the adder 22 is normally less than the value 255 in a white area, the output value of adder 22 becomes less than the threshold of the comparator 33, forcing the output from the comparator 33 to be "0" which will again force the inverter 36 to output a "1" (white). Likewise, similar to the function of the dither RAM 16 described above, the grey scale values exceeding a predetermined "lowest value" (e.g. 80) are forced to be "black" (and will have the value 0). This will, via the inverter 35, force the input to the adder 22 to the 8-bit value 255, and together with the 8-bit error signal from the error signal from the error filter 25 comprising the other input to the adder 22, the output value of adder 22 exceeds the threshold of the comparator 33, forcing the output from the comparator 33 to be "1", which will again force the inverter 36 to output a "0" (black). The controller 10 may likewise control the slope of the transfer curve between the limit values. When the transfer curve is chosen so that input values in a given range are decreased, the reproduced output impage from the error diffusion algorithm of that range will appear more dark, because the error diffusion algorithm will decrease the distance between 'black' output pixels. This fact makes it possible to compensate for foreground variations by adjusting the characteristics of the transfer curve according to the adaptive threshold statistics. In a preferred method, the slope of the transfer curve according to the adaptive threshold statistics. In a preferred method, the slope of the transfer curve shown in FIG. 9 is increased by increasing the start value of the slope (e.g. from 80 to 100) when the adaptive thresholds increases and visa versa. In a practical implementation, it will be sufficient to select one out of a number of predefined transfer curves.

Figure 10:
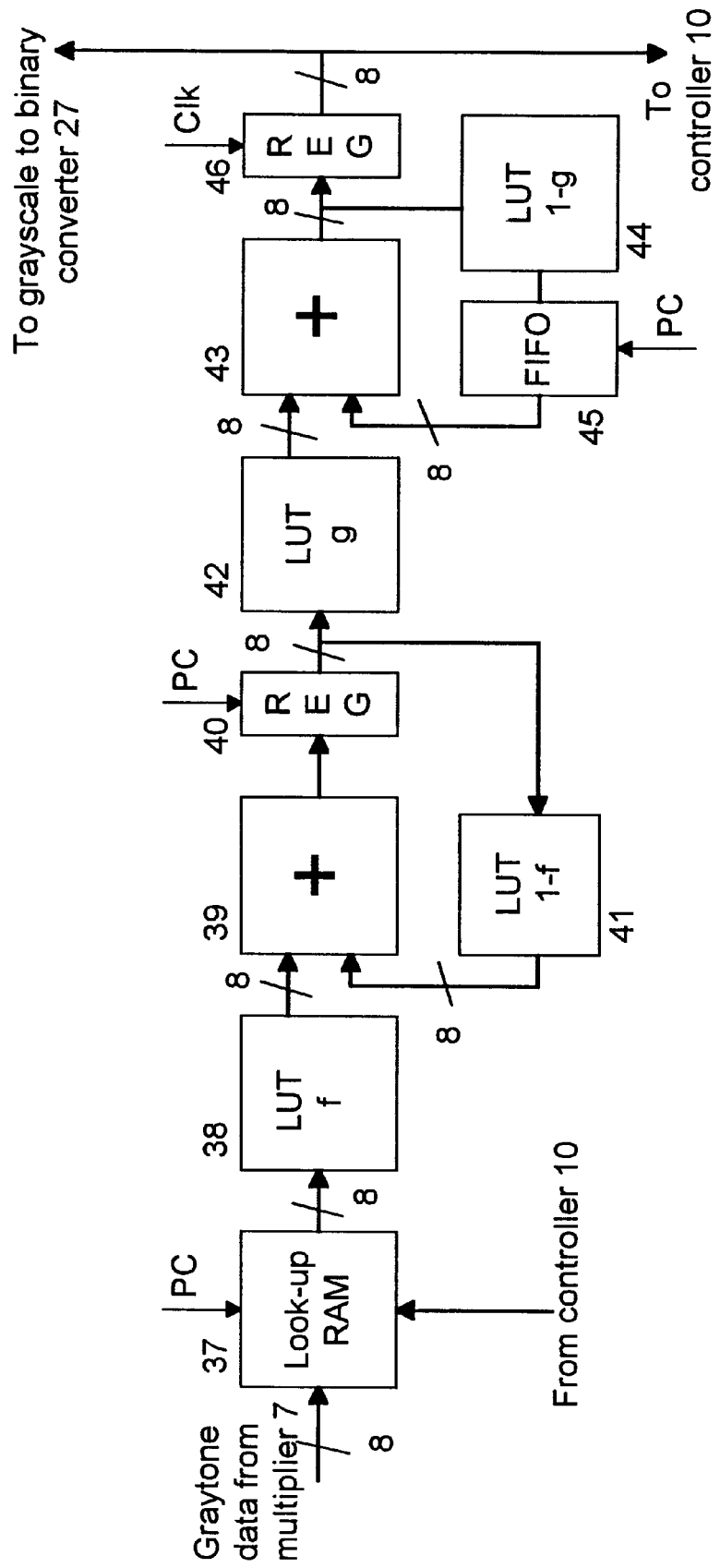
FIG. 10 shows an embodiment based on a low-pass digital filter threshold circuit according to the invention.

A further alternative embodiment of the adaptive threshold circuit for a unit according to the invention is shown in FIG. 10. The adaptive threshold circuit is based on a two dimensional digital low pass filter providing a running area average of pixel grey tone values along scan lines. The adaptive threshold circuit in FIG. 10 may replace the corresponding parts shown in FIG. 1 and FIG. 5, said parts comprising the adaptive threshold circuit 26, 9, 22, 17 based on storing the adaptive threshold values in zones along the scan line.

In the present embodiment the multi-bit signal comprises 8-bit (values 0–255) which is passed from the multiplier 7 to a look-up RAM 37, in which there is stored a previously loaded transfer curve. The multi-bit signal is clocked by the pixel clock PC. The addressed 8-bit look-up value is passed via the multiplication-by-f LUT 38 (0<f<1) to an adder 39. A first feedback signal is added to the multiplied signal by the adder 39. The sum from the adder 39 is stored in a register 40 clocked by the pixel clock PC, the 8-bit output from register 40 is branched, and via one branch after multiplication-by-(1-f) in LUT 41 passed on as said first feedback signal to the adder 39, and, via the other branch after multiplication-by-g in LUT 42 (0<g<1), transferred as input to an adder 43. A second feedback signal is added to the signal from the divider 42 by the adder 43. The 8-bit sum from the adder 43 is branched and, via one branch after multiplication-by-(1-g) in LUT 44, stored in the FIFO 45 clocked by the pixel clock PC. After a delay of one scan line in FIFO 45, the 8-bit sum is passed on as said second feedback signal to the adder 43. Via the other branch, the 8-bit sum is stored in a register 46 in dependence on the resolution clock CLK. The 8-bit output from register 46, constituting a two-dimensional running area average of the pixel grey tone values scanned, is branched and passed on to the greyscale-to-binary converter 15, 27 and to the controller 10 as the continuously updated adaptive threshold value. It is well known to one skilled in the art to extend the area included in the two-dimensional average by altering the reduction factors in the digital low pass filter defining LUTs 38, 41, 42, 44 e.g. changing a multiplication-by-½ in LUT 38 and LUT 41 to one-eighth-part in LUT 38 and seventh-eighth-part in LUT 41.

Further controller 10 is connected to the loop-up RAM 37 for loading a transfer curve similarly to the example shown in FIG. 9, the actual transfer curve loaded is determined by the controller 10 based on the operator settings for brightness/contrast and document type being scanned, e.g. line drawing, blueprint, map.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive manner.

I claim:

1. A method for preparing for reproduction of a document based on scanning of an original comprising foreground grey tone values and background grey tone values, the method comprising the steps of:

generating a signal representing grey tone values for pixels along scanned lines across the original;

providing adaptive threshold values for said pixels, and converting said signal into a first one-bit signal being responsive to said adaptive threshold, said one-bit signal indicating whether either foreground or smooth background formed by scanned pixels is present;

converting the signal into a second one-bit signal representing pseudo halftones by means of a dither process; and generating a one-bit output signal in response to the first one-bit signal and the second one-bit signal, such that the halftone values are disabled in the output signal when a smooth background area is present.

2. A method according to claim 1, wherein the signal representing grey tone values is generated as a digital multi-bit-signal.

3. A method according to claim 1, wherein the resolution of the reproduction is variable based on the resolution of scanning.

4. A method according to claim 3, wherein the signal representing grey tone values is interpolation filtered prior to being received in the converter, said interpolation filtering allowing the variable resolution of the reproduction to be greater than the resolution of scanning.

5. A method according to claim 1, wherein the adaptive threshold values are determined in dependence on the grey tone values of the scanned original.

6. A method according to claim 5, wherein the adaptive threshold values are calculated as quasi-stationary values within a number of zones along the scanned lines.

7. A method according to claim 5, wherein the adaptive threshold values are calculated representing quasi-stationary values as output from a filtering process.

8. A method according to claim 5, wherein the signal representing grey tone values is delayed prior to being received in the converter, said delay allowing the threshold determination to be based on grey tone values from points both preceding and succeeding the points for which the adaptive threshold values are determined.

9. A method according to claim 1, wherein said dither circuit comprises threshold values represented as elements in dither matrices.

10. A method according to claim 9, wherein said dither matrices are determined according to the adaptive threshold values.

11. A method according to claim 10, wherein a minimal element value of said dither matrices is determined by the adaptive threshold value, and wherein the other element values are distributed between a maximum value and said minimal element value.

12. A method according to claim 9, wherein said adaptive threshold values are used to select one out of a number of predefined dither matrices.

13. A method according to claim 1, wherein said dither circuit comprises an error diffusion circuit.

14. A method according to claim 13, wherein said error diffusion circuit comprises a transfer curve which is adjusted according to the adaptive threshold values.

15. A method according to claim 1, wherein the step of converting further includes:
    comparing the signal representing grey tone values with the adaptive threshold values to convert the individual grey tone values into a first one-bit representation;
    passing the signal representing grey tone values through a dither circuit to convert the individual grey tone values into a second one-bit-representations; and
    selecting one of the two one-bit representations as the selected one-bit representation output from the converter.

16. A method according to claim 15, wherein the two one-bit representations represent the logical states, "white" or "black", said logical state "white" being selected as output from the converter when both one-bit-representations represent the logical state "white", otherwise logical state "black" being selected.

17. A method according to claim 15, wherein the second one-bit representation is selected when a grey tone value is greater than a selected limit value.

18. A method according to claim 1, wherein the step of converting the signal further includes:
    creating a difference signal by subtracting the adaptive threshold values from the signal representing grey tone values;
    transferring said difference signal by means of a transfer curve;
    adjusting said transfer curve according to the adaptive threshold values;
    passing the transferred signal representing grey tone values through a dither circuit for converting the individual grey tone values into a one-bit representation.

19. An apparatus for preparing the reproduction of a document based on scanning of the original comprising foreground grey tone values and background grey tone values, said apparatus comprising:
    a line scanning unit for generating a signal representing grey tone values for pixels along scanned lines across the original;
    means for providing adaptive threshold values for said pixels, and converting said signal into a first one-bit signal being responsive to said adaptive threshold, said one-bit signal indicating whether either foreground or smooth background formed by scanned pixels is present;
    means for converting the grey tone signal received from the line scanning unit into a second one-bit signal representing pseudo halftones by means of a dither process; and
    means for generating a one-bit output signal in response to the first one-bit signal and the second one-bit signal, such that the halftone values are disabled in the output signal when a smooth background area is present.

20. An apparatus according to claim 19, wherein the resolution of the reproduction is variable to resolution of scanning.

21. An apparatus according to claim 20, wherein the signal representing grey tone values is interpolation filtered prior to being received in the converter, said interpolation filtering allowing the variable resolution of the reproduction to be greater than resolution of the scanning.

22. An apparatus according to claim 19, wherein a controller unit controls a clock signal generator, said clock signal generator supply pixel clock signal, a line clock signal and a resolution clock signal in dependence on reproduction resolution, and conversion into a one-bit signal is performed in dependence on the resolution clock signal.

23. An apparatus according to claim 22, wherein the means for converting includes:
    a grey-scale-to-binary-comparator receiving the grey tone signal from the line scanning unit and adaptive threshold values for converting the individual grey tone values into a one-bit representation;
    a dither circuit receiving a grey tone value from the line scanning unit and a set of set-up values for converting the individual grey tone values into a one-bit representation; and
    a logical unit for selecting one of the one-bit representations from said grey-scale-to-binary-comparator and the dither circuit as the one-bit representation output from the means for converting.

24. An apparatus according to claim 23, wherein the logical unit includes a logical AND gate.

25. An apparatus according to claim 23, wherein the controller unit includes a first memory unit in which the adaptive threshold values are stored, and a second memory unit in which the dither circuit set-up values are stored, the values from said first memory unit and second memory unit being transferred to a first RAM and a second RAM connected to said grey-scale-to-binary-comparator and said dither circuit respectively.

26. An apparatus according to claim 25, wherein each RAM is associated with at least one counter and receives values from the at least one counter as input, said counters counting the number of pulses in the clock signals, said values addressing cells in the respective RAM, content of the addressed cells being transferred as a present threshold value respectively to said grey-scale-to-binary-comparator and said dither circuit.

27. An apparatus according to claim 19, wherein a signal generating means generates a digital multi-bit signal representing grey tone values along scanned lines, said digital provided as input for said converter.

28. An apparatus according to claim 27, wherein delay means is provided for delaying the signal representing grey tone values prior to the reception in the means for converting, to allow the threshold determination to be based on grey tone values from pixels both preceding and succeeding the pixels for which the adaptive threshold values are determined.

29. An apparatus according to claim 19, wherein the means for providing the set of adaptive threshold values is determined for the pixels along the lines across the scanned original in dependence on the grey tone values of the scanned original.

30. An apparatus according to claim 29, wherein the means for providing the set of adaptive threshold values determines threshold values for a number of zones comprising the pixels along the scanned lines.

31. An apparatus according to claim 19, wherein the dither circuit means includes a memory unit in which a dither matrix is stored.

32. An apparatus according to claim 31, having controller means modifying the dither matrix in dependence on the grey tone values in a scanning line, or preceding scanning lines.

33. An apparatus according to claim 19, wherein said dither circuit comprises an error diffusion circuit.

34. An apparatus according to claim 19, wherein said dither circuit comprises a look-up RAM whose contents are adjusted according to an adaptive threshold value.

35. A method for preparing for reproduction of a document based on scanning of an original comprising the steps of:

generating a signal representing grey tone values for points along lines across the scanned original;

providing adaptive threshold values for said points;

providing a one-bit representation for said points by means of a dither circuit; and converting the signal into a signal comprising a one-bit representation, the output of said conversion being responsive to the individual grey tone values, the adaptive threshold values, and the dither one-bit representation, wherein:

said dither circuit comprises threshold values represented as elements in dither matrices, and said adaptive threshold values are used to select one out of a number of predefined dither matrices.

36. A method for preparing for reproduction of a document based on scanning of an original comprising the steps of:

generating a signal representing grey tone values for points along lines across the scanned original;

providing adaptive threshold values for said points;

providing a one-bit representation for said points by means of a dither circuit; and converting the signal into a signal comprising a one-bit representation, the output of said conversion being responsive to the individual grey tone values, the adaptive threshold values, and the dither one-bit representation, wherein the conversion includes:

creating a difference signal by subtracting the adaptive threshold values from the grey tone signal;

transferring said difference signal by means of a transfer curve;

adjusting said transfer curve according to the adaptive threshold values; and passing the transferred grey tone signal through a dither circuit for converting the individual grey tone values into a one-bit representation.

* * * * *

UNITED STATES PATENT AND TRADEMARK OFFICE
CERTIFICATE OF CORRECTION

PATENT NO. : 5,926,570
DATED : July 20, 1999
INVENTOR(S) : Asbjorn Smitt

It is certified that error appears in the above-identified patent and that said Letters Patent is hereby corrected as shown below:

In claim 22, line 3, please change "generator supply pixel" to --generator to supply a pixel--.

In claim 27, line 3, please change "digital" to --digital multi-bit--.

In claim 31, line 2, please delete "means".

Signed and Sealed this

Eighth Day of May, 2001

Attest:

NICHOLAS P. GODICI

Attesting Officer

Acting Director of the United States Patent and Trademark Office